United States Patent [19]
Prendergast

[11] Patent Number: 5,370,535
[45] Date of Patent: Dec. 6, 1994

[54] APPARATUS AND METHOD FOR PRIMARY CONTROL LOADING FOR VEHICLE SIMULATION

[75] Inventor: William K. Prendergast, Kirkwood, N.Y.

[73] Assignee: CAE-Link Corporation, Binghamton, N.Y.

[21] Appl. No.: 977,275

[22] Filed: Nov. 16, 1992

[51] Int. Cl.⁵ .......................... G09B 9/08; G09B 19/16
[52] U.S. Cl. ........................................ 434/45; 434/29; 434/59; 434/372; 364/578; 370/85.1; 273/148 B
[58] Field of Search ............................ 364/424.05, 578; 434/29, 45, 59, 71, 365, 372; 244/175, 223; 273/85 G, 148 B, 438, DIG. 28; 340/825.5, 825.51, 825.52; 370/85.1, 85.2, 85.3, 94.1, 94.3

[56] References Cited

U.S. PATENT DOCUMENTS

| | | | |
|---|---|---|---|
| 3,220,121 | 11/1965 | Cutler | 434/45 |
| 3,463,866 | 8/1969 | Staples | 434/45 |
| 4,227,319 | 10/1980 | Guy et al. | 434/45 |
| 4,236,325 | 12/1980 | Hall et al. | 434/45 |
| 4,398,889 | 8/1983 | Lam et al. | 434/45 |
| 4,912,343 | 3/1990 | Stuart | 310/14 |
| 5,209,661 | 5/1993 | Hildreth et al. | 434/45 |

OTHER PUBLICATIONS

"Electric Control Loading-A Low Cost, High Performance Alternative" by Baigni, Interservice/Industry Training Systems Conference, Nov. 6-8, 1990, pp. 247-254.

*Primary Examiner*—Richard J. Apley
*Assistant Examiner*—Joe H. Cheng
*Attorney, Agent, or Firm*—Malin, Haley, DiMaggio & Crosby

[57] ABSTRACT

An electronic control loading system to create tactile control feel for vehicles and vehicle simulators (especially aircraft) to provide a realistic reaction force by coupling a linear electro-magnetic actuator to a control element for real-time feedback from a preprogrammed computer controller. In an aircraft simulation system, a loadcell and position transducer are associated with the flight control element for measuring applied force and determination of flight control element position. The position transducer is integrated with an actuator, the actuator being capable of setting forth a drive force that reacts to the force and position data as manipulated by a preprogrammed computer based upon an aircraft data package used to construct real-time software models and a digital signal processor or the like high speed microprocessor used to manipulate flight control algorithms. The output is directed to a power amplifier of the actuator resulting in a reaction force to the flight control element based upon the software model by control of current to the actuator.

13 Claims, 6 Drawing Sheets

APPARATUS AND METHOD FOR PRIMARY CONTROL LOADING FOR VEHICLE SIMULATION

BACKGROUND OF THE INVENTION

1. Technical Field

This invention relates to control loading, and, more particularly, to an improved control loading system for use in vehicle and aircraft simulation systems employing digitally controlled linear electro-magnetic actuators in place of conventional hydraulic actuators.

2. Background Information

Various types of control systems exist for the control of the major flight operating components of modern aircraft. Depending upon the size and type of aircraft, such control systems vary from a yoke or stick connected to a mechanical cable linkage to the latest control technology termed "fly-by-wire". The majority of aircraft control systems, both commercial and military, are based upon a combination of electrically controlled hydraulic actuators. The control loading system provides the pilot of the aircraft with the ability to control aileron, elevator and other aircraft control elements with an artificially induced "feel" for the action produced. This "feel" for controlling the major components, (i.e., rudder, aileron, elevator) is extremely important in that it provides a constant tactile feedback to the pilot. For instance, if a pilot traveling at Mach 2 operates the rudder, the dynamic pressure placed upon the rudder makes any attempt in rudder change a manual effort. This physical effort can prevent excessive rudder changes at high speeds. In an aircraft simulator, the control loading system must accurately reproduce this "feel" in all simulated flight regimes for the control stick, yoke, and pedals.

Flight simulators are widely used and accepted today because they provide the capability and fidelity to safely and effectively train flight crew members in the execution of normal, abnormal and emergency operating procedures. Situations such as engine-failures can be created in the flight simulator, which would not be prudent or practical to attempt in the actual aircraft. Further, simulators reduce the need for non-revenue training flights and conserve aviation fuel.

Today's sophisticated flight simulators trace their genealogy back to the grounded flight trainers developed by Edwin A. Link, Jr. in the 1930's. Over the years, aircraft simulators have become more and more technically sophisticated. Modern day simulators are driven by computer and are often mounted on synergistic 6 degree-of-freedom motion systems. Fiberglass shells are often used to reproduce the exterior profile of the flight deck; with interior equipment, often actual aircraft parts, supported from said shell so as to exactly duplicate the interior of the cockpit, including the control stick (or yoke) and rudder pedals are employed.

Critical to the simulator is the need for a realistic control system that provides the pilot with control training but further provides a realistic "feel" of aircraft operation. Prior art control loading systems used in simulators parallel actual aircraft operation by the use of simulator hydraulic systems which replicate the actual forces on the control components throughout the flight envelope. Analog and digital control loops based on hydraulic fluid pressure are used. Obvious problems in using a hydraulic system within flight simulators include hydraulic leaks, hydraulic lines and pumps, and costly hydraulic actuators.

The use of electrical rotary motors has also been attempted with flight simulators. The rotary motors suffer from error inducing force ripples due to fixed, wound-wire poles and provide relatively low torque which must be geared to produce usable forces, giving poor accuracy in the proper feel. U.S. Pat. No. 3,463,866 issued to Staples discloses a control loading system using a servo feedback loop in combination with a digital computer. The disclosure sets forth a flight control system that is simulated with hardware which is slaved to a servo for feedback to the simulator. An electrical and hydraulic flight control system is disclosed in U.S. Pat. No. 4,227,319 issued to Bernard Guy et al., providing a hydraulic piston actuator which when moved a distance by the pilot's controller creates a servo signal which represents part of a reaction force opposing the control force generated.

The present invention eliminates the problems associated with hydraulic and rotary electrical control loading systems through the use of a digitally controlled linear electrical actuator that can be accurately programmed to correlate to numerous different aircraft.

Although especially useful for flight simulators, the principles of the invention could be used in other vehicle simulators and in actual aircraft control systems.

SUMMARY OF THE INVENTION

An electrical control loading system for a flight simulator which simulates the forces on a flight control system of a predetermined aircraft is described herein. The electrical control loading device utilizes a replicated aircraft flight control element, a force measuring transducer, a computer program, and a linear electromagnetic actuator to produce the replicative flight control forces manually experienced by the pilot as the pilot manipulates the flight control elements such as the control stick and rudders.

The electronic based control loading system of the instant invention is based upon a flight control element that has an axis of relative movement about a singular point. The flight control element, such as a pilot control stick, is manually operable by the pilot of the aircraft or simulator to control the aircraft flight path and is used in its ordinary function of providing flight control information with a secondary function for generating flight control signals that form the basis of this invention. At the base of the flight control element is placed a force transducer or loadcell for measuring the applied force and a position transducer to measure the position of the flight control element. The loadcell produces an electrical signal representative of the control forces placed upon the flight control element for interpretation by a digital processor and any reaction forces placed thereon by a linear electromagnetic actuator which provides a linear drive force to the flight control element as directed by said processor.

The linear actuator is comprised of magnetic circuitry defining a radially directed flux in two directions, the circuitry placed concentric about the flight control element. Each magnetic circuit provides for radially directed flux both in an inward and outward direction. A coil placed in the flux paths for receipt of a control signal allows current to be applied in one direction through those portions of the coil disposed in the inward radially directed flux and applied in the opposite direction through those portions of the coil disposed in the outwardly directed flux so that the flux/current product of the coil portions and associated flux are additive.

The flight control element is measured for force and position wherein the information is amplified before delivery to a computer controller. The calculated computer tactile force is coupled between the controller and module containing the amplifiers by an analog or digital data transfer means, the controller having flight control algorithms manipulated by a digital signal processor. The calculated computer tactile force signals are returned to the actuator power module providing the actuator force command signals to a power amplifier. The amplifier output is coupled to the linear actuator which generates, through the amplifier signals, the tactile resistance force upon the flight control element. The amplifier responds to the reaction of flight controls simulating the "feel" of the flight controls as if a mechanical or hydraulic type conventional force was exerted upon the non-existing flight control components. The goal is to ensure that the control stick tactile feel to the pilot is accurate relative to the particular aircraft in use or simulated.

The system includes an electronic control loading model editor that is an object oriented software design computer program that allows the simulation manufacturer or user to draw the aircraft control system to be simulated, specify known values and automatically create an electronic control loading real-time load without programming a single line of code. Thus, the electronic control loading real-time load can be written to a floppy disk and installed on the electronic control loading controller, which is a dedicated computer containing a digital signal processor board to handle high speed mathematics required by the control algorithms and an I/O board to communicate with the actuator module. An ethernet or equivalent card communicates real-time simulation data to the host computer.

An aircraft data package is used in the electronic control loading model builder. The layout of an aircraft control system for providing the calculated force response is provided by identifying the individual elements of the mechanical system of an aircraft and assigning characteristic values to the elements based the aircraft manufacturer's data or actual measurements. The model editor is then used to draw system elements and the values assigned to the elements. Once the aircraft elements are assigned a value, the simulation load can be calculated and transferred to the controller unit.

Thus, in summary, a preferred embodiment of the instant invention would include a computer work station using a programmable controller with the electronic control loading program placed upon a floppy disk, the simulator host computer having all the aerodynamic data necessary to give real-time flight information to the electronic control loading controller. The electronic controller is connected to an actuator power module that contains the load cell amplifier, a position transducer amplifier, a direct current power supply and a pulse width-modulated power amplifier, all of which are connected to the specific electro-magnetic actuator used in the invention. The flight control element such as the cockpit stick, yoke, wheel, or pedals are connected to the load cell.

Accordingly, a primary object of the present invention is the integration of a linear electro-magnetic actuator as a force producing element for elimination of hydraulic replicating systems through the use of a pulse width modulated servo power amplifier. The system is adaptable to numerous other applications including vehicle control. The site specific applications will be obvious to one skilled in the art and are deemed part of this invention.

Still another object of the present invention is to provide a flight control system that is programmable to simulate the "feel" of any type of aircraft depicted to be simulated in real-time dynamic scenarios.

Another object is to provide a flight control system that forgoes the use of hydraulics and/or rotary motors thereby eliminating the aforementioned disadvantages.

Still another object is to provide a flight control system that can simulate minute or resonating vibration that is realistic to flight control elements not previously provided by the use of prior art systems.

Yet another object is to provide an alternative flight control force generator artificial feel system for fly-by-wire aircraft allowing a the pilot to obtain a "feel" for the aircraft by use of linear electro-magnetic actuators.

Yet still another object of the instant invention is to provide an improved flight simulator control loading system employing a digital processor for interpretation of conventional flight control algorithms based upon an input from a human operated flight control element providing an output as directed by the processor in real-time providing a resistive force to the flight control element.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Although the invention is described herein in terms of specific embodiments of aircraft flight simulators, it will be readily apparent to those skilled in this art that various modifications, rearrangements and substitutions can be made without departing from the spirit of the invention.

Figure 1:
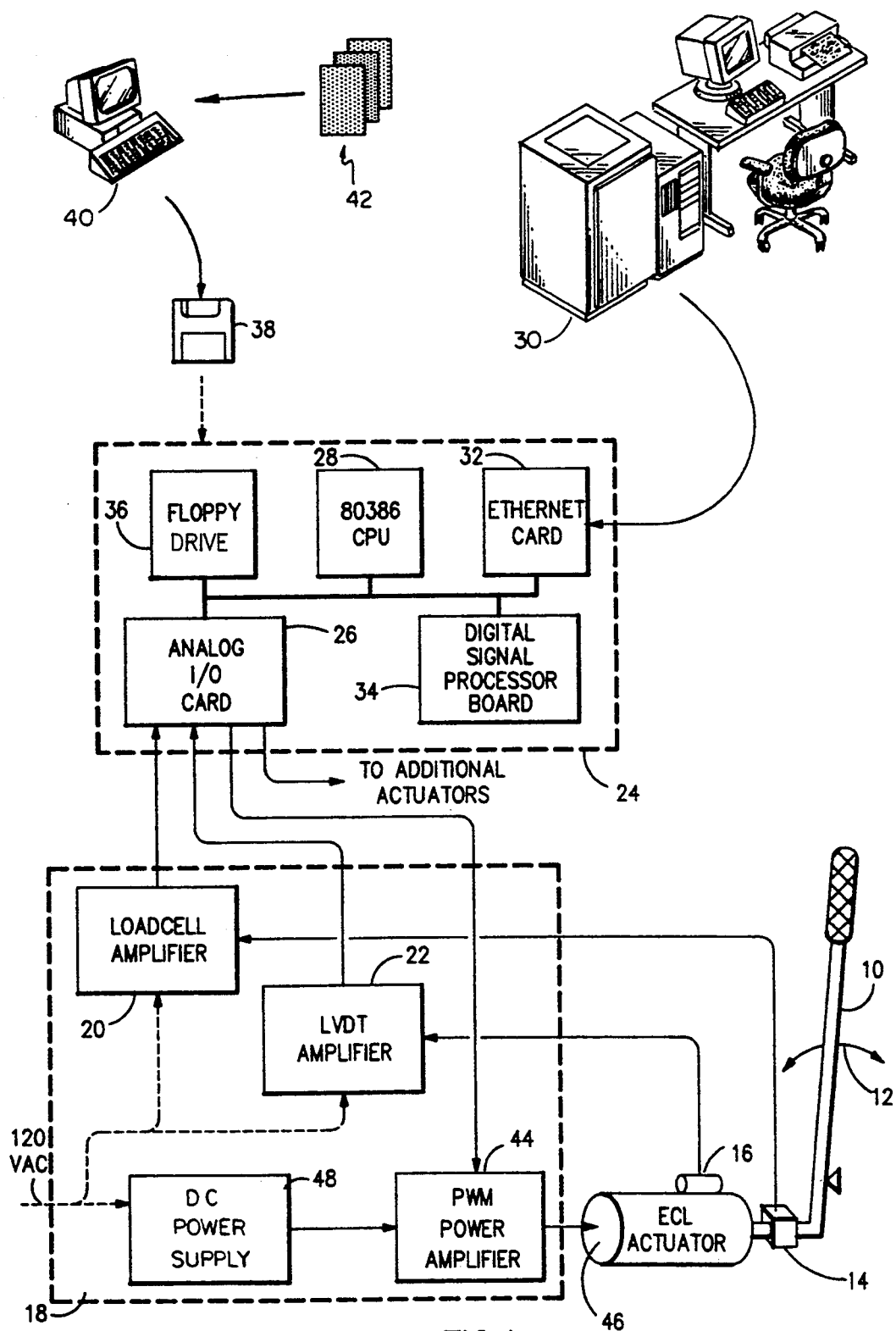
FIG. 1 is a diagrammatic representation of simulator control system according to the instant invention.

Referring to FIG. 1, a diagrammatic representation of the simulator control system is shown wherein a flight control element 10, namely a pilot cockpit control stick, has a first axis of relative movement 12 about pivot or lever point 12a operable by the pilot of the aircraft simulator when used in its ordinary function, i.e. elevator or aileron control, with a secondary function for generating flight control signals that are necessary for the operation of this invention. At the base of the flight control element is a loadcell 14 for measuring the applied force to the flight control element 10 by the pilot with a position transducer 16 further determining flight control element 10 position. An actuator power module 18 is electrically coupled to the loadcell 14 housing a loadcell amplifier 20 and the position transducer amplifier 22.

Transfer of data between the actuator power module 18 and a main controller 24 is by an analog or digital cabling link to an I/O communications board 26. The controller 24 is comprised of a 80386, 80486, 88000, RISC 6000 or the like high speed microprocessors 28 cabled to a simulator host computer 30 by ethernet card 32. A Digital Signal Processor board 34 provides the high speed processor for flight control algorithms and simulation models. A floppy disk drive 36 is provided for transfer of software instructions on disk 38 prepared on a remote computer 40. Aircraft specific flight data 42 is provided for an electronic control loader model editor 41 to create the model and load on a floppy disk 38.

The controller 24 manipulates the force and position signals received from the loadcell 14 and transducer 16 providing a real-time feedback through the communication board 26 wherein the signal is amplified through a power amplifier 44 for operation of a linear actuator 46 which is composed of a magnetic circuit for defining radially directed flux in two directions. One such actuator is manufactured by Aura Systems, Inc., disclosed under U.S. Pat. No. 4,912,343, the disclosure of which is incorporated herein. Amplifier 44 provides the power necessary for operation of the actuator 46 using a locally mounted DC power converter 48 for operation of the actuator 46.

Figure 2:
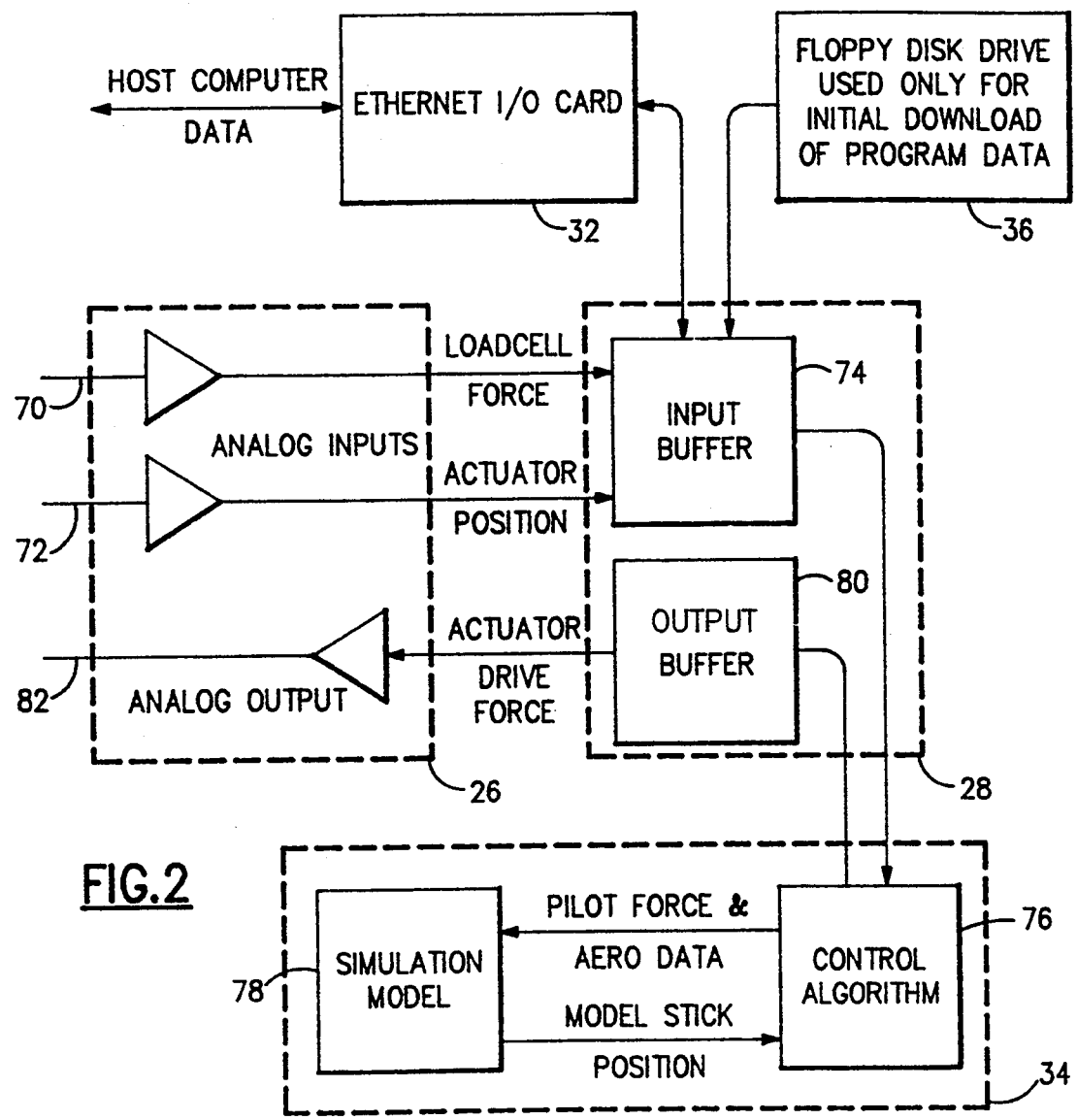
FIG. 2 is a diagrammatic representation of a the interface between the flight control element unit and the host simulator.

FIG. 2 provides a more detailed illustration of the controller 24 wherein the signal inputs from the actuator power module 18 as shown in FIG. 1 obtain the loadcell force signal 70 and the actuator position 72, providing signals to the input buffer 74 of the CPU 28. The buffer 74 interfaces with the host computer by the ethernet I/O card 32 wherein the data received is based upon the aircraft known values provided through the program disk instructions 38 provided to the flight control algorithms 78, the data fed to the simulation model for feedback through the algorithms 76. The output buffer 80 stores the actuator drive force before analog conversion and output to the analog power amplifier 44 which in turn causes operation of the actuator 46 and the required resistance to cockpit stick 10. The linear actuator 46 provides an instantaneous reaction to the movement of the cockpit stick 10 simulating the "feel" of the flight controls as if a conventional force was exerted by the control system of the aircraft comprised of frictional forces and aircraft specific forces based upon the trim, flaps, dynamic pressure, and other known factors.

Figure 3:
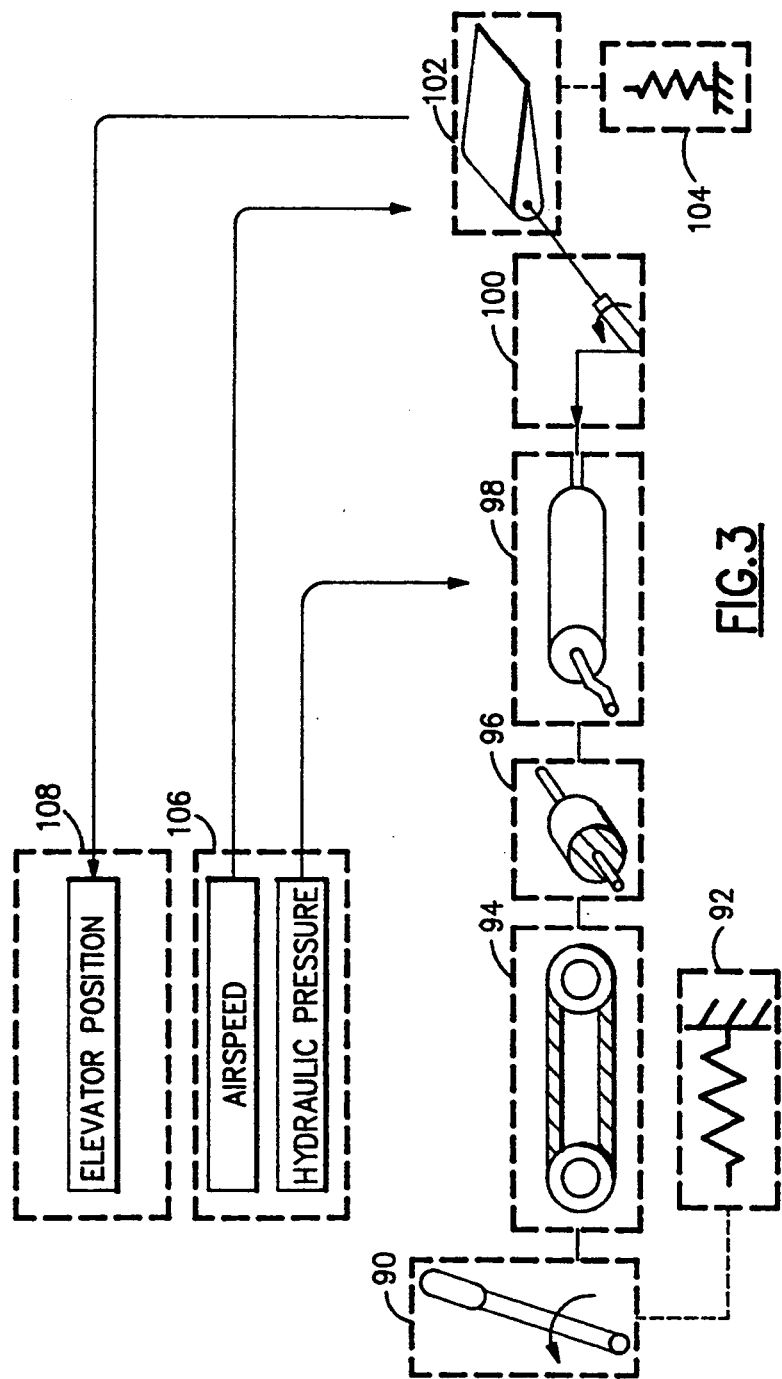
FIG. 3 is a diagrammatic representation of the aircraft programmable values with examples of host computer interfaces.

FIG. 3 is a diagrammatic representation of the aircraft programmable values with examples of host computer interfaces wherein each block is a calculable value and may be expressed in the form of a conventional algorithm and/or a simple mathematical formula. The flight control element 90 movement includes frictional forces and resistance by the centering spring 92 and fore-aft connection cable 94. For the elevator, the aft mass 96 is predictable together with a conventional elevator hydraulic assist booster 98 coupled to the frictional forces caused by the elevator movement arm 100, elevator surface 102, and the elevator downspring 104. For aircraft simulation purposes, the host computer may insert airspeed and hydraulic pressure 106 and receive the elevator position 108. On fly-by-wire aircraft, sensors can provide speed, pressure, and so forth for input into the control algorithms.

Figure 4:
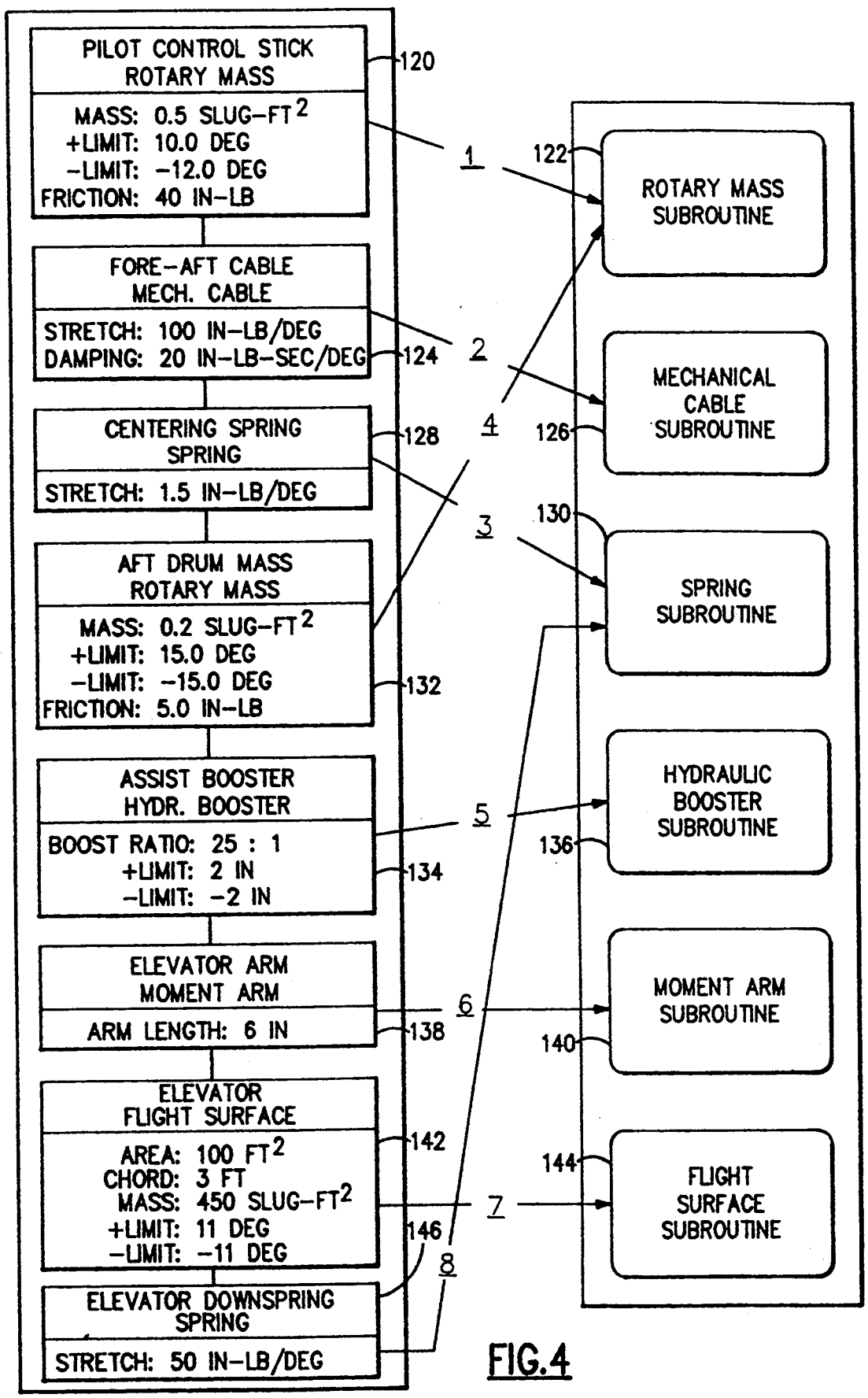
FIG. 4 is a block diagram of a simulation example generally referenced in FIG. 3.

FIG. 4 sets forth an example of an object oriented design software flow for building an electrical control loading simulation load. This example, based upon the pictorial of FIG. 3, sets forth the predetermined layout of an example aircraft control system based on aircraft design information as described by identifying the individual elements of the mechanical system and assigning characteristic values to the elements based on aircraft manufacturer's data or actual measurements. A model editor is used to draw system elements and the values assigned to the elements. Shown is the mass of the pilot control stick 120 having a rotary mass moment of 0.5 slug-ft$^2$ with a positive limit of 10 degrees and a negative limit of 12 degrees, and the friction is set at 40 in-lbs. This information is used by the rotary mass subroutine 122 of the simulation library.

The fore-aft mechanical cable linkage 124 is defined as having a 100 in-lb/deg stretch rate with a 20 in-lb-sec/deg damping constant which is used by the mechanical cable subroutine 126 of the element simulation library. A model definition assigned to the centering spring 128 is a stretch rate of 1.5 in-lb/deg used by the spring routine 130. The aft drum rotary mass 132 is shown having a rotary mass moment of 0.2 slug-ft$^2$ with a limit of ±15.0 degrees and 5.0 in-lb of friction used by the rotary mass subroutine 122. The hydraulic booster 134 is defined as having a boost ratio of 25:1 with a limit of ±2 inches. This information is used by the hydraulic booster subroutine 136. Elevator moment arm 138 length of 6 inches is used by the moment arm subroutine 140. Elevator Flight Surface 142 is defined by example as having a 100 ft$^2$ surface area with a mean chord length of 3 ft and a mass of 450 slug-ft$^2$. The limit of movement is set at ±11 degrees. The flight surface variables are used by the flight surface subroutine 144 of the element library. The final element of the example is the elevator downspring 146 having a stretch rate of 50 in-lb/deg which is used by the spring subroutine 130.

The host computer adds the hydraulic pressure and airspeed as previously described into the hydraulic booster and flight surface subroutines. The elevator position provides the position input for the host computer evaluation. Thus, the electronic control loading can be made in real-time, by use of a digital signal processor board or high speed microprocessor for the control algorithms and an I/O board, to communicate with the actuator module. The layout of an aircraft control system for providing the calculated force response is provided by identifying the individual elements of the mechanical system of an aircraft and assigning characteristic values to the elements based on the aircraft manufacturer's data or actual measurements. Once the aircraft elements are assigned a value, the simulation load can be calculated and transferred to the controller unit.

Figure 5:
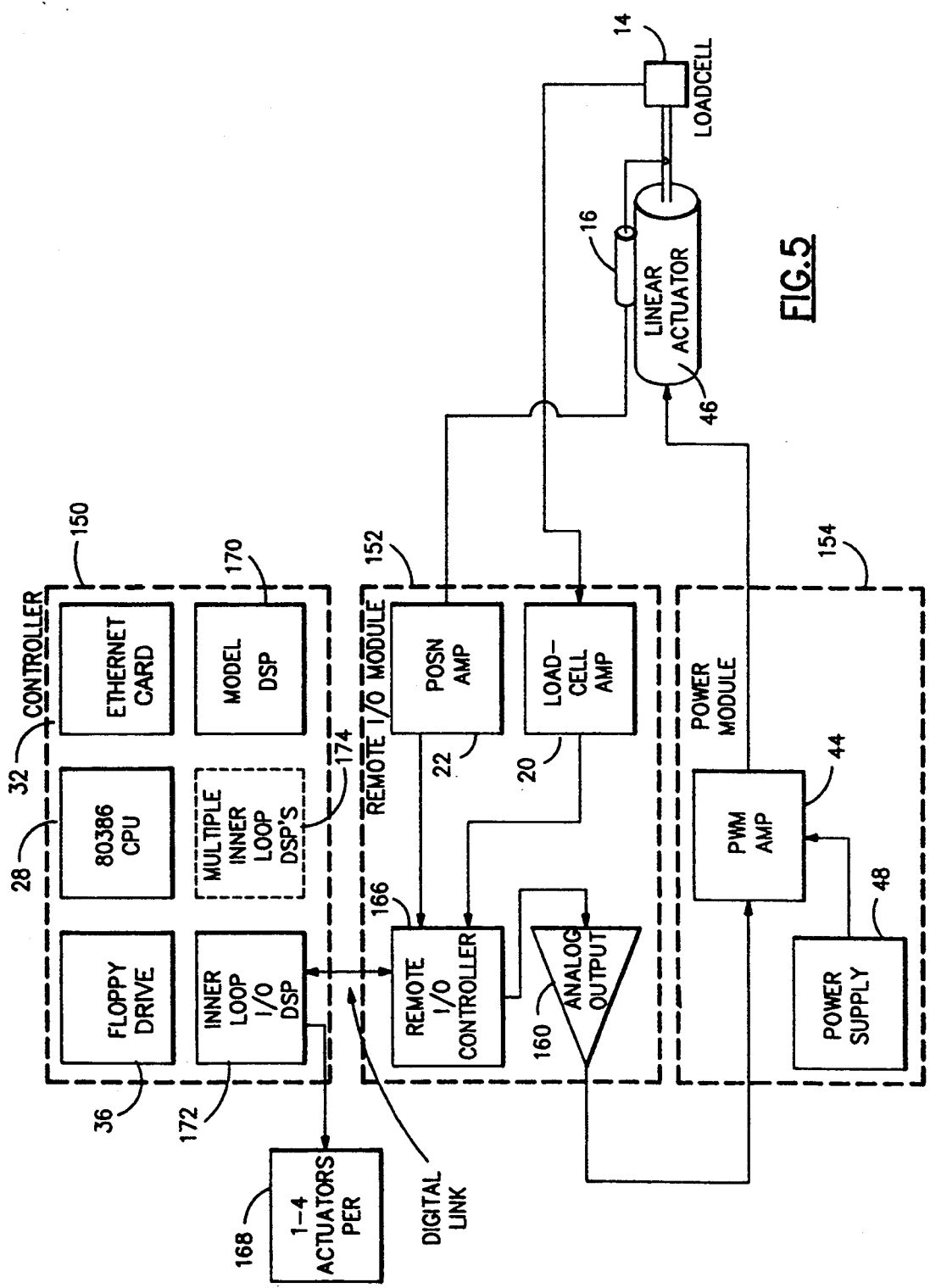
FIG. 5 describes an alternate preferred embodiment of the invention in a diagrammatic representation of a simulator control system according to the instant invention.

Referring now to FIG. 5, an alternate preferred embodiment of the invention is shown comprising three modular elements: controller 150, remote I/O module 152, and the power module 154. Position transducer 16 provides a signal to the position amplifier 22 which transmits a signal to the remote I/O controller 166. At the same time the loadcell 14 provides a signal to the loadcell amplifier 20 which also provides a signal to the remote I/O controller 166. Thus, the remote I/O gets amplified signals regarding the force and position of the control element connected to loadcell 14. The remote I/O controller 166 provides analog-to-digital and digital-to-analog signal conversions and communicates digitally to a digital signal processor board 172 which executes the servo control algorithms for up to four electric linear actuators 168 and multiple inner loop digital signal processor boards 174 if required. A second digital signal processor board 170 computes a real-time flight control simulation model resulting in servo control commands for the servo digital signal processor board 172.

The remote I/O controller 166 also provides return signals to an analog output 160 to provide signals back to the pulse width module amplifier 44 connected to the power supply 48. The power module 154 thus provides signal current to linear actuator 46 to provide the real-time resistive forces necessary to provide the proper feel back to the control element or control stick.

Thus, in the embodiment shown in FIG. 5, the controller 150 manipulates force and position signals received from loadcell 14 and position transducer 16 providing real-time feedback through the servo digital signal processor board wherein the output signals amplified through the power amplifier 44 as described herein.

Figure 6:
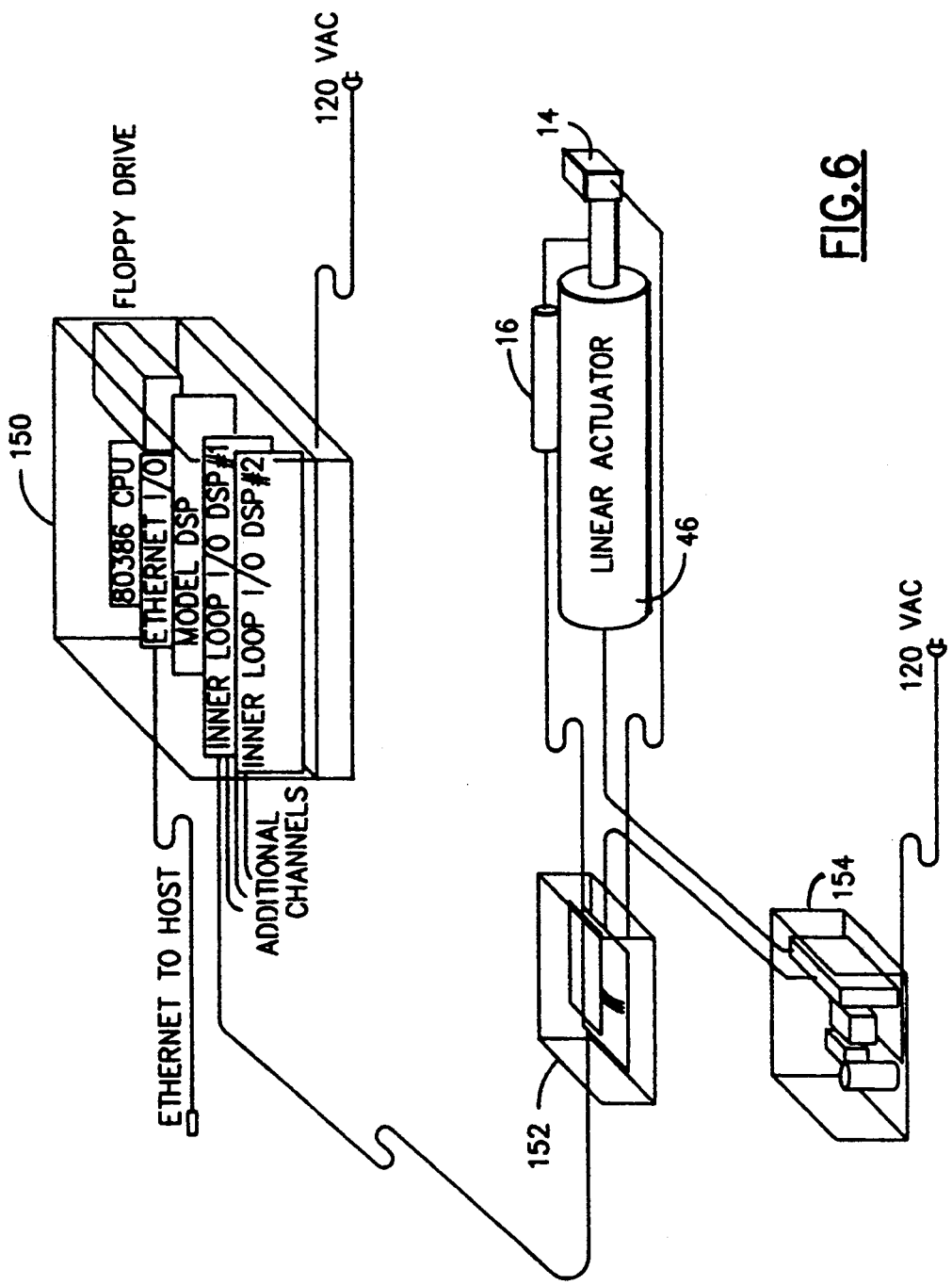
FIG. 6 shows a diagrammatic representation of the simulator control system in accordance with the preferred embodiment shown in FIG. 5 block diagram.

FIG. 6 shows the relationship between the power module 154 which provides a signal to the linear actuator 46. The loadcell 14 and the position transducer 16 provides signals to the remote I/O module 152 which in turn provides digitized signals to the controller 150. Feedback signals are then provided again through the remote I/O 152 back to the pulse width modulator servo amplifier 44.

The invention can be used for land, air, ship, and space vehicle simulation in environments requiring accurate tactile control "feel." The invention may also find use in actual aircraft control systems.

It is to be understood that with respect to the certain illustrated and described forms of my invention disclosed herein, the invention is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. An electronic based control loading apparatus providing a realistic reaction force for vehicle and aircraft simulators, said control loading apparatus comprising:
    manually actuated control means having a first axis of relative movement;
    first transducer means for measuring applied force connected to said control means;
    second transducer means connected to a power supply means and said control means for determining the position of said control means;
    electro-magnetic linear displacement means operatively associated with said first transducer and said second transducer and said control means for applying a linear drive force to said control means; and
    microprocessor means comprising a local area network allowing real time communication between a computer central processing unit and an external simulator control terminal, said microprocessor means providing real-time drive current control to said displacement means;
    whereby an applied force on said control means and the position of said control means result in a linear drive force on said control means determined by said microprocessor means based upon the algorithms included in said microprocessor means.

2. The control loading apparatus according to claim 1 wherein said first transducer means is a loadcell.

3. The control loading apparatus according to claim 1, wherein said power supply means including a power amplifier, and wherein said linear displacement means includes an actuator integrated with said first transducer means and said second transducer means providing a linear drive force on said control means through control of said power amplifier electrically coupled to said actuator providing operational current for said actuator.

4. The control loading apparatus according to claim 1 wherein said microprocessor means includes a digital signal processor and a magnetic storage device utilizing data produced by said digital signal processor for processing a plurality of flight control algorithms by communication transfer from said first transducer means and said second transducer means.

5. The control loading apparatus according to claim 1 wherein said microprocessor means includes a conventional high speed computer and a magnetic storage device utilizing data produced by said conventional high speed computer for processing a plurality of flight control algorithms by communication transfer from said first transducer means and said second transducer means.

6. The control loading apparatus according to claims 4 or 5 wherein said magnetic storage device includes computer instructions developed on a remote computer system wherein a model editor determines aircraft operational characteristics using active flight data calculated while the aircraft is in operation.

7. The control loading apparatus according to claim 1 further comprising an electronic based loading mechanism providing conventional flight reaction forces for aircraft having fly-by-wire operating systems.

8. The control loading apparatus according to claim 1 wherein said microprocessor means includes a database having resonating vibration information therein for simulating resonating vibration found in a vehicle control system.

9. An electronic based control loading apparatus providing a realistic reaction force for aircraft simulators, said control loading mechanism comprising:
    simulated aircraft control means having a first axis of relative movement operable by a pilot, said control means having a primary function of flight control and a secondary function for generating flight control signals;
    loadcell means connected to said control means for measuring applied force to said control means;
    transducer means connected to said control means for determining the positional location of said control means;
    electro-magnetic linear displacement means operatively connected with said loadcell means and said control means for applying a linear drive force to said control means; and computer means comprising a local area network allowing real time communication between a computer central processing unit and an external simulator control terminal, said computer means providing real-time current control to said displacement means;

whereby an applied force on said control means results in conventional flight control, and further results in a drive force as determined by said computer means.

10. An electronic based control loading apparatus providing a realistic reaction force for fly-by-wire aircraft simulators, said control loading apparatus comprising:

a control means operable by a pilot, said control means having a first axis of relative movement, said control means having a primary function of flight control and a secondary function for generating flight control signals;

first transducer operatively coupled with said control means for measuring applied force to said control means;

second transducer operatively associated with said control means for measuring the position of said control means;

electro-magnetic linear actuator means coupled with said first and second transducers for providing a drive force to said control means;

a main controller comprising a local area network allowing real time communication between a computer central processing unit and an external simulator control terminal, said main controller providing real-time drive current control to said electro-magnetic linear actuator means; and a power amplifier electrically coupled to said actuator means;

whereby an applied force on said control means is directly proportional to signals received from said power amplifier.

11. A method of providing realistic reaction forces for the flight control element in an aircraft simulator, said method comprising:

generating a signal by coupling a transducer and an electro-magnetic linear control actuator to a conventional flight control element for interpreting force and movement thereof;

amplifying said generated signal representing force and movement into a first analog carrier signal;

transferring said carrier signal to a programmable controller and converting said carrier signal into a digital signal;

inserting said digital signal into a predetermined real-time software program having a means for simulating aircraft operation;

processing said digital signal;

converting said processed digital signal into a second analog signal and transferring said second analog signal to an actuator power amplifier;

amplifying said second analog signal;

controlling said control actuator by said amplified second analog signal by placing a force on said flight control element based upon algorithms generated by said programmable controller, said programmable controller being interfaced to said flight control element, said programmable controller comprising a local area network allowing real time communication between a computer central processing unit and an external simulator control terminal, said programmable controller providing real-time drive current control to said control actuator.

12. The method according to claim 11 further including generating a simulation computer program programmed by the inclusion of known aircraft values for real-time electronic control loading by identifying individual elements of a mechanical system of an aircraft and assigning characteristic values to said individual elements based on actual flight data calculated while the aircraft is in operation.

13. The method according to claim 11 wherein said step of processing includes the use of a high speed microprocessor.

* * * * *